United States Patent [19]

Mack

[11] Patent Number: 4,488,395

[45] Date of Patent: Dec. 18, 1984

[54] MULTIPLE PURPOSE LAWN MOWER HAVING DISPOSABLE RECEPTACLE

[76] Inventor: Ralph B. Mack, 196 Green Bay Rd., Glencoe, Ill. 60022

[21] Appl. No.: 489,527

[22] Filed: Apr. 28, 1983

[51] Int. Cl.³ .............................................. A01D 35/26
[52] U.S. Cl. ...................................... 56/13.4; 56/320.2
[58] Field of Search ................... 56/320.2, 320.1, 202, 56/13.4, 13.3, 16.6

[56] References Cited

U.S. PATENT DOCUMENTS

| | | | |
|---|---|---|---|
| 2,726,503 | 12/1955 | Phelps | 56/320.2 |
| 2,777,271 | 1/1957 | Sutton | 56/13.4 |
| 2,990,666 | 7/1961 | Blume | 56/320.2 |
| 3,186,152 | 6/1965 | Epstein | 56/320.2 |
| 3,987,606 | 10/1976 | Evans | 56/320.2 |
| 4,173,111 | 11/1979 | Peterson | 56/320.2 |

FOREIGN PATENT DOCUMENTS 31158  7/1981  European Pat. Off. ........... 56/320.2

Primary Examiner—Jay N. Eskovitz
Attorney, Agent, or Firm—Anthony S. Zummer

[57] ABSTRACT

This invention relates to an improved lawn mower construction adapted for cutting vegetation into pieces and delivering the cut vegetation pieces into a disposable flexible air impervious baglike receptacle for disposal of the cut vegetation pieces. The lawn mower includes a housing having a plurality of wheels movably supporting the housing. A prime mover, such as, a gasoline internal combustion engine is mounted on the housing. The prime mover has a drive shaft drivingly connected thereto. A cutting blade is connected to the shaft. The cutting blade is mounted in the housing for cutting vegetation under the housing and throwing the cut vegetation pieces toward the outer periphery of the housing. A blower impeller is mounted on the drive shaft within the housing for blowing air out of the housing. A junction is a part of the housing for receiving air and cut vegetation pieces propelled by the blade and air blown by the impeller for moving the cut vegetation pieces. A conduit is connected to the junction for carrying the cut vegetation pieces in an upward direction. A head is connected to the upper end of the conduit. The head includes a diffuser to allow air to leave the head and to allow cut vegetation pieces to drop down due to gravity. An air impervious disposable flexible baglike receptacle is connected to the head for receiving the cut vegetation pieces dropping from the diffuser to collect the cut vegetation pieces.

10 Claims, 5 Drawing Figures

MULTIPLE PURPOSE LAWN MOWER HAVING DISPOSABLE RECEPTACLE

BACKGROUND OF THE INVENTION

1. Field Of The Invention

The subject invention relates to an improved construction for a lawn mower. The utilization of a rotary lawn mower, as opposed to a reel type lawn mower, allows a lawn keeper to cut lawn which is considerably longer than that which may be cut with the reel type lawn mower. The longer grass clippings then must be picked up, otherwise, the lawn may be injured. In addition, in certain seasons of the year, it is desirable to remove from a lawn foreign vegetation, such as, leaves. Although leaf sweepers are popular, they simply pick up the leaves, whereas, the utilization of a lawn mower to pick up the leaves provides a double function. The lawn is cut and the leaves are picked up. It may be appreciated that with large lawns, when the lawn is cut, especially with leaves on the lawn, the cut material must be collected and then the material which has been cut must be carried away in some manner. A typical method of disposing of the cut vegetation pieces is to place the cut vegetation in plastic bags to be hauled away by a scavenger.

2. Description Of Prior Art

The utilization of collectors for cut vegetation pieces in conjunction with lawn mowers is well known. One general type of collector is one which is secured to the lawn mower and the cut vegetation pieces are delivered to it through a conduit from the cutting blade. When the receptacle becomes filled, the cut vegetation pieces are removed from the receptacle and carried away. A number of persons have worked in this area. United States patents which are typical of this general type of construction are listed below:

| | | |
|---|---|---|
| 3,664,099 | Chouinard | 5/23/72 |
| 3,987,606 | Evans | 10/26/76 |
| 4,158,280 | Thomas et al | 6/19/79 |
| 4,168,600 | Klug et al | 9/25/79 |
| 4,310,998 | Cuba | 1/19/82 |

It may be appreciated that when the grass is long or there are many leaves on the grass, even though the grass and/or the leaves are cut up into small pieces for dense packing in a receptacle, the receptacle having a limited volume, may become filled quickly. It is then encumbent upon the operator to stop the cutting operation and to remove the material from the collecting receptacle and transfer it to a disposable receptacle. The problem has been recognized in the prior art and a number of devices have been developed which include a disposable receptacle which is connected to the lawn mower. A number of patents show typical devices. These United States Patents are:

| | | |
|---|---|---|
| 3,802,173 | Opitz | 4/09/74 |
| 3,971,198 | Lane | 7/27/76 |
| 4,030,273 | Leader | 6/21/77 |
| 4,043,100 | Aumann et al | 8/23/77 |
| 4,233,806 | Richardson | 11/18/80 |

The prior art devices taught in the second group of patents have a limitation in that most of the devices depend upon the rotatable blade to throw the cut vegetation with a sufficient force to carry it upward and into the receptacle. A problem occurs when the grass is long and especially when it is wet. The additional weight of the cut vegetation tends to slow down the rate of movement of the cut vegetation pieces and some pieces are not carried to the required height but become lodged in the conduit between the blade and the entrance to the receptacle. The result is that an obstruction occurs causing a buildup in the conduit which oftentimes results in a complete blockage of the conduit. The operator then must stop the motor and clear the conduit. It is recognized that it is desirable to provide induced air movement by providing a suction impeller, as taught in the afore mentioned patent to Aumann et al. It may be appreciated that the suction type arrangement has a limitation on the level of pressure which may be generated for moving the vegitation pieces and requires an expensive and complicated arrangement for the device.

SUMMARY OF THE INVENTION

The present invention relates to an improved multiple purpose lawn mower adapted for cutting vegetation into pieces and delivering the cut vegetation pieces to a disposable flexible air impervious baglike receptacle. The lawn mower includes a housing. A plurality of wheels movably support the housing. A prime mover, such as, a gasoline internal combustion engine is connected to the housing. A drive shaft is drivingly connected to the prime mover and extends into the housing. A rotary cutting blade is connected to the drive shaft and is mounted in the housing for cutting vegetation under the housing and throwing cut vegetation pieces toward the outer periphery of the housing. A blower impeller is mounted on the drive shaft within the housing, blowing air out of the housing. A junction which is part of the housing receives cut vegetation pieces propelled by the blade and receives air blown by the impeller moving the cut vegetation pieces. A conduit is connected to the outlet of the junction for carrying the cut vegetation pieces propelled by the blade and the air from the impeller in a generally upward direction. A head is connected to the upper end of the conduit. The head includes a diffuser for allowing air to leave the head and to allow the cut vegetation pieces to drop down due to gravity. An air impervious disposable flexible baglike receptacle is connected to the head for receiving the cut vegetation pieces dropping from the diffuser to collect the cut vegetation pieces.

DESCRIPTION OF THE PREFERRED EMBODIMENT

Figure 1:
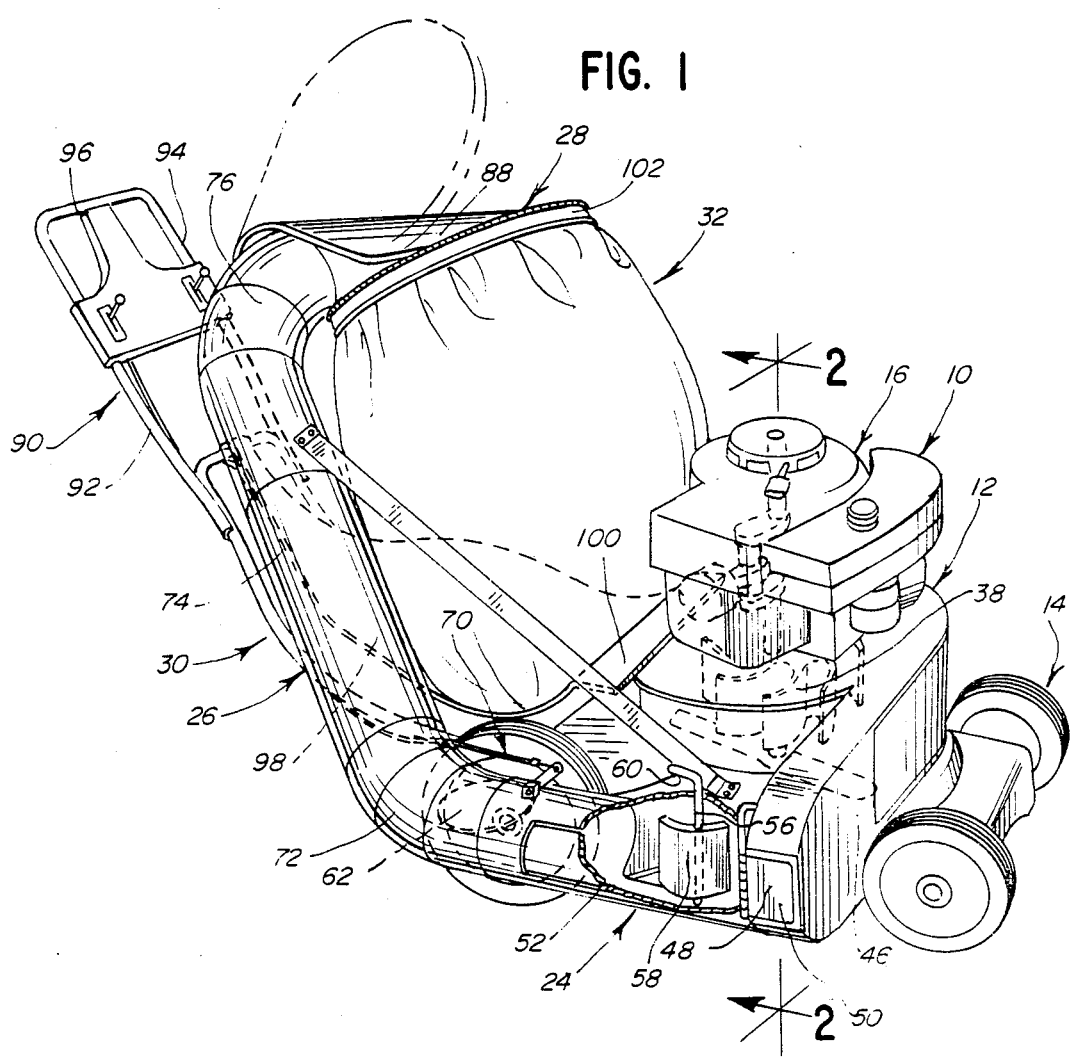
FIG. 1 is a perspective view of a lawn mower embodying the herein disclosed invention.
Figure 2:
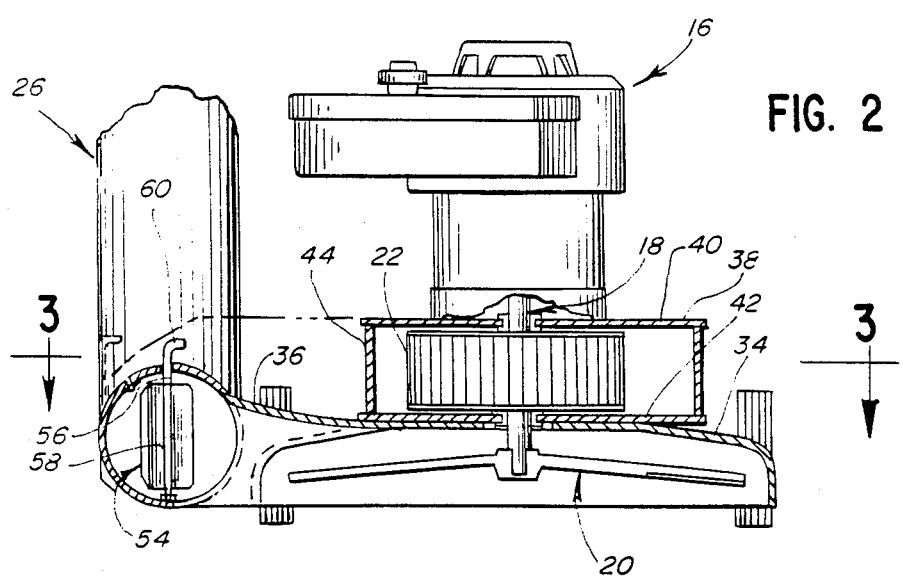
FIG. 2 is a cross sectional view taken on line 2—2 of FIG. 1 showing the relationship of a cutting blade and an impeller on a drive shaft of the lawn mower of FIG. 1.

Referring now to the drawings, and especially to FIGS. 1 and 2, a lawn mower embodying the herein disclosed invention is shown therein and is generally indicated by numeral 10. The instant lawn mower generally includes a housing 12 movably supported by four conventional lawn mower wheels 14. A conventional prime mover 16 is mounted on the top of the housing, and a drive shaft 18 is connected to the prime mover. A rotary cutting blade 20 is fixed to the end of shaft 18 in the lower portion of the housing, and an impeller 22 is mounted on the shaft within the housing between the prime mover and the rotary cutting blade. A junction 24 is part of the housing and is connected to the remainder of the housing to receive air from the impeller and cut materials impelled by the rotary cutting blade. An elongated generally cylindrical conduit 26 has its lower end connected to junction 24 and its upper end connected to a head 28. A receptacle support assembly 30 is connected to the housing, and a conventional flexible air impervious disposable baglike receptacle 32 is connected to head 28 and supported on the receptacle support assembly 30.

In addition to junction 24, housing 12 includes a conventional rotary blade housing 34 with a conventional chute 36 connected to the rotary blade housing to receive cut vegetation pieces. Housing 12 also includes a blower housing 38 mounted on top of blade housing 32, as may be best seen in FIG. 2. Blower housing 38 includes an upper support plate 40 and a lower plate 42 which are connected to each other by a shroud 44.

Prime mover 16 is, in this instance, a conventional gasoline internal combustion engine which is mounted on the upper support plate. It may be appreciated that any type of prime mover may be used in this instance. For instance, the prime mover could be an electric motor or any other suitable source of rotational power.

Drive shaft 18 is connected to engine 16 in a conventional and well known manner. The drive shaft extends downward from the gasoline engine through the blower housing and into the blade housing. Impeller 22 is a conventional blower impeller and is fixed to the drive shaft to rotate with the drive shaft. Cutting blade 20 is a conventional rotary lawn mower cutting blade and is fixed to the end of the drive shaft for rotation within the blade housing. As blade 20 rotates, it cuts material which is below the housing. As is conventional with rotary lawn mowers, blade 20 cuts the material and impells the material to the outer periphery of the housing to expell the material from the housing into chute 36.

Junction 24 includes an arm 46 which communicates with shroud 44 of the blower housing to receive air under pressure delivered by the impeller. The arm includes an aperture 48 at one end. A door 50 is hingedly mounted on the arm for controlling the flow of air out of aperture 48. The junction includes a body 52 which communicates with chute 36 to receive cut pieces impelled by the blade. As may be seen in FIG. 3, the air under pressure from the blower housing and cut pieces meet and combine in the junction.

A vane valve 54 is pivotally mounted in junction 24. The vane valve includes an axle 56 which is rotatably mounted in the junction. A vane body 58 is fixed on the axle. Axle 56 includes a control arm 60 formed integral therewith to provide a means for pivoting the axle in order to position the vane body in a selected attitude. The position of the vane body regulates the flow of air from the impeller flowing into combination with cut pieces delivered to the chute and thereby controls the rate of flow of cut pieces out of the junction.

A gate valve 62 is mounted at the exit to junction 24. Gate valve 62 includes a gate valve body 64 which is connected to pivot 66. A control arm 68 is connected to body 64 and is in turn, connected to a conventional control assembly 70. It may be appreciated that the pivoting of the valve body 64 from the attitude shown in FIG. 4 to a vertical attitude closes off the exit of the junction and thereby prevents any material from leaving the junction.

Conduit 26 includes an elbow 72 which is connected to the outlet of junction 24. The conduit includes a straight upwardly sloping cylindrical portion 74 which is connected to an upper elbow 76. The upper elbow is connected to head 28.

Head 28 includes a diffuser assembly 78. The diffuser assembly includes a perforated open sided shield 80 which is connected to aperture plate 82. Aperture plate 82 has a plurality of outlet apertures 84 with a screen 86 mounted in each of the apertures. A cover 88 is hingedly connected to the diffuser assembly in a conventional manner. The cover is open on one side above upper elbow 76 so that the air leaving the diffuser is directed to one side and not to the rear toward the operator who is normally behind the lawn mower. It may be appreciated that small bits of dirt and vegetation are carried by the air leaving the diffuser so that it is necessary to protect the operator. A clamping ring 102 is mounted on head 28. The clamping ring includes a hoop 104 with a conventional clasp 106 for securing the clamping ring to the head.

A conventional lawn mower handle 90 is connected to housing 12. The handle includes a pair of spaced arms 92 and 94 connected by a conventional cross bar 96. A receptacle support 98 is mounted between the handles and is connected to the housing. Receptacle support 98 includes an ear 100 which is fixed to the housing.

Receptacle 32 is a conventional plastic film disposable air impervious bag which has its mouth connected to the head and held thereto by the clamping ring. The bottom of the receptacle is supported on the receptacle support to hold the receptacle as it is filled with cut pieces.

Figure 3:
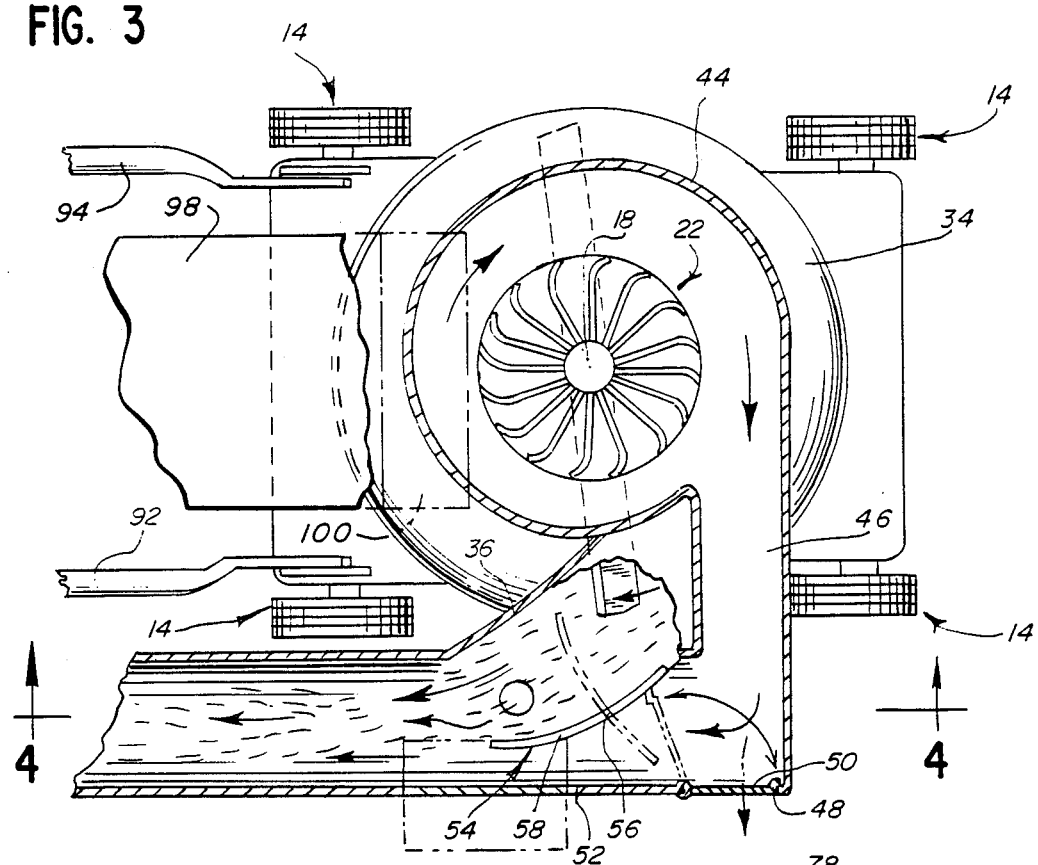
FIG. 3 is a cross sectional view taken on line 3—3 of FIG. 2 being a plan view showing the relationship of the flow of cut vegetation pieces from the blade and air from the impeller.
Figure 5:
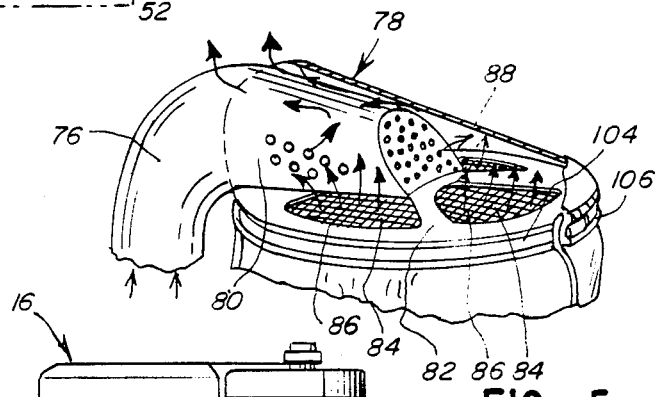
FIG. 5 is a perspective view of a portion of the head with a cover removed to show the construction of the diffuser.
Figure 4:
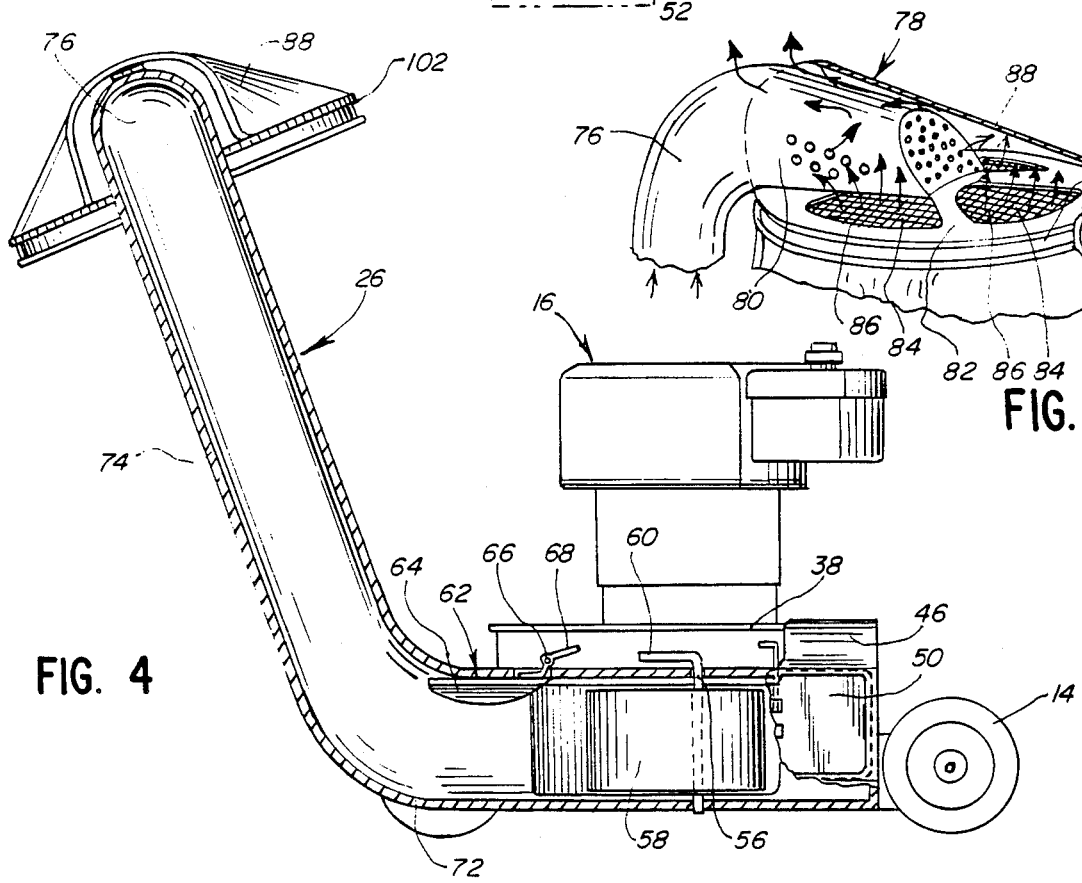
FIG. 4 is a cross sectional view taken on line 4—4 of FIG. 3 with a conduit extended to a head showing the relationship of the housing, the conduit and the head.

In the normal operation of the instant lawn mower, the vane valve is positioned in the attitude shown in FIG. 3 and the gate valve is in the attitude shown in FIG. 4. The lawn mower is pushed forward on wheels 14. The engine rotates blade 20 and impeller 22 simultaneously. As is conventional, blade 20 cuts grass and other vegetation, and should there be any leaves or any other materials, the blade cuts up that material. The blade throws the cut pieces into chute 36. Simultaneously, impeller 22 forces air into arm 56 and into the junction. The air from the impeller flows past vane body 58 and mixes with the air and cut vegetation pieces which were thrown into chute 36. The air from the junction enters conduit 26, and the cut vegetation pieces are carried upward in the conduit. The air leaves the diffuser assembly, while the cut vegetation pieces drop down into receptacle 32. It may be appreciated that as the size of the cut vegetation pieces varies or the weight varies due to moisture on the lawn, the operator may adjust the amount of air which is delivered from the impeller so that the vegetation pieces are carried up to the head and do not become cloged in the conduit or junction. The vane valve is adapted so that the cut vegetation pieces are not propelled with such a great force that they are forced into engagement with the diffuser and close off the diffuser. By the proper utilization of the vane valve, the balance of the amount of air delivered by the impeller and the density of the cut vegetation pieces may be adjusted so that the cut vegetation pieces simply flow to the head and then drop into the receptacle.

The construction of the subject lawn mower includes the mounting of the impeller on the drive shaft with the blade so that there is a minimum of parts required for driving the two separate devices, inasmuch as both the impeller and the cutting blade are on the same shaft. A further advantage flows from this arrangement in that the blade and the impeller are tied together so that as the blade turns faster, so does the impeller to produce more air. Thus, once the required proportioning of air from the impeller to the cut vegetation pieces is determined, as the speed of the drive shaft is adjusted by adjusting the speed of rotation, the proportioning of air under pressure to the cut vegetation pieces remains constant.

The subject construction has additional advantages in that once receptacle 32 becomes filled, it is not necessary to shut down the prime mover, but rather simply the gate valve is closed. The cover is raised, and the lock ring is released so that the receptacle may be removed from the head. Another receptacle is placed on the head and locked into position with the clamping ring. The gate valve is then opened, and the lawn mower then may be used in its normal fashion.

In the event that it is desired to mulch vegetation, the subject device may be utilized to mulch as well as cut. The gate valve is closed so that cut vegetation pieces are not delivered to the receptacle, but rather the cut vegetation pieces is contained within the blade housing. Thus, the cut vegetation pieces are futher cut up into a mulch by the blade.

The instant lawn mower may also be used as a blowing device to blow light-weight materials from a lawn, sidewalk, driveway or other large area. In order to utilize the subject lawn mower as a blowing device, it is only necessary to close the gate valve and to open door 50 which provides access to aperture 48. Thus, the air under pressure delivered by the impeller is blown out under pressure through aperture 48 to blow loose materials away from the lawn mower.

It may be appreciated that the instant construction utilizes an impeller to produce air under pressure, which may be utilized in a variety of ways. The air under pressure may be utilized to blow away materials or it may be utilized to carry cut vegetation pieces. The pressure of air is regulated by the rate of rotation of the impeller. Thus, a wide range of pressure may be delivered by the instant impeller to operate the subject lawn mower.

Although a specific embodiment of the herein disclosed invention has been shown in the accompanying drawings and described in detail above, it is readily apparent that those skilled in the art may make various modifications and changes without departing from the spirit and scope of the present invention. It is to be expressly understood that the instant invention is limited only by the appended claims.

What is claimed is:

1. A lawn mower adapted for cutting vegetation into pieces and delivering the cut vegetation pieces to a flexible air impervious baglike receptacle for disposal of the vegetation pieces comprising, a housing, a plurality of wheels connected to the housing movably supporting the housing, a prime mover connected to the housing, a drive shaft drivably connected to the prime mover, a cutting blade connected to the drive shaft and mounted in the housing for cutting vegetation under the housing and throwing out vegetation pieces toward the outer periphery of the housing, a blower impeller mounted on the drive shaft within the housing blowing air out of the housing, a junction being a portion of the housing for receiving cut vegetation pieces propelled by the blade and air blown by the impeller for moving the cut vegetation pieces, a mixing vane valve mounted in the junction with one side of the vane valve adjacent to the cut vegetation pieces propelled by the blade and the other side of the vane valve adjacent to the air blown by the impeller with the air blown by the impeller merging with the cut vegetation pieces propelled by the blade beyond the end of the vane valve, said vane valve selectively proportioning the amount of air received from the impeller to the volume of flow of blade impelled cut vegetation pieces, said junction being spaced from the drive shaft a distance greater than the distance from the drive shaft to the end of the cutting blade, a conduit connected to the junction for carrying the cut vegetation pieces propelled by the blade and the air in an upward direction, a head connected to the upper end of the conduit, said head having a diffuser to allow air to leave the head and to allow the cut vegetation pieces to drop down due to gravity, and an air impervious flexible baglike receptacle connected to the head for receiving the cut vegetation pieces dropping from the diffuser to collect the cut vegetation pieces in the receptacle, whereby proper proportioning of air from the impeller to the cut vegetation pieces at the diffuser allows the vegetation pieces to drop into the receptacle.

2. A lawn mower adapted for cutting vegetation into pieces and delivering the cut vegetation pieces to a flexible air impervious baglike receptacle for disposal of the vegetation pieces as defined in claim 1, wherein said head includes a releasable clamping ring for selectively securing the open end of the receptacle to the head, and including a support connected to the housing for receiving the bottom of the receptacle.

3. A lawn mower adapted for cutting vegetation into pieces and delivering the cut vegetation pieces to a flexible air impervious baglike receptacle for disposal of the vegetation pieces as defined in claim 1, including, a gate valve mounted in the conduit for selectively closing off the flow of air and cut vegetation pieces into the conduit, whereby the interruption of flow of air and cut vegetation pieces into the conduit retains the vegetation pieces in the housing for further cutting by the blade to mulch the vegetation.

4. A lawn mower adapted for cutting vegetation into pieces and delivering the cut vegetation pieces to a flexible air impervious baglike receptacle for disposal of the vegetation pieces as defined in claim 1, including, a support connected to the housing for receiving the receptacle at the bottom of the receptacle, whereby vegetation pieces held in the receptacle are held up by the support.

5. A lawn mower adapted for cutting vegetation into pieces and delivering the cut vegetation pieces to a flexible air impervious baglike receptacle for disposal of the vegetation pieces as defined in claim 1, said housing including a selectively opened aperture to allow air driven by the blower impeller to escape to the side of the housing, whereby air escaping from the side of the housing blows debris away from the lawn mower.

6. A lawn mower adapted for cutting vegetation into pieces and delivering the cut vegetation pieces to a flexible air impervious baglike receptacle for disposal of the vegetation pieces as defined in claim 1, wherein said head includes a releasable lock ring for selectively securing the open end of the receptacle to the head.

7. A lawn mower adapted for cutting vegetation into pieces and delivering the cut vegetation pieces to a flexible air impervious baglike receptacle for disposal of the vegetation pieces as defined in claim 1, wherein the head includes a cover hingedly connected to the diffuser for directing air and certain particles carried by the air to escape to one side of the lawn mower.

8. A lawn mower adapted for cutting vegetation into pieces and delivering the cut vegetation pieces to a flexible air impervious baglike receptacle for disposal of the vegetation pieces as defined in claim 1 including, a support connected to the housing for supporting the bottom of the receptacle, and a gate valve mounted in the conduit for selectively closing off the flow of air and cut vegetation pieces into the conduit, whereby interruption of the flow of air and cut vegetation pieces into the conduit retains the vegetation pieces in the housing for further cutting by the blade to mulch the vegetation.

9. A lawn mower adapted for cutting vegetation into pieces and delivering the cut vegetation pieces to a flexible air impervious baglike receptacle for disposal of the vegetation pieces as defined in claim 1 including, a gate valve mounted in the conduit for selectively closing off the flow of air and vegetation pieces to the conduit, and said housing including a selectively opened aperture on one side of the housing to allow air driven by the blower impeller to escape selectively to the side of the housing, whereby air escaping from the side housing blows debris away from the lawn mower.

10. A lawn mower adapted for cutting vegetation into pieces and delivering the cut vegetation pieces to a flexible air impervious baglike receptacle for disposal of the vegetation pieces ad defined in claim 1, wherein the head includes a cover hingedly connected to the diffuser for directing air and certain particles carried by the air to escape to one side of the lawn mower, and a releasable clamping ring for selectively securing the open end of the receptacle to the head.

* * * * *

UNITED STATES PATENT AND TRADEMARK OFFICE
CERTIFICATE OF CORRECTION

PATENT NO. : 4,488,395
DATED : December 18, 1984
INVENTOR(S) : Ralph B. Mack

It is certified that error appears in the above-identified patent and that said Letters Patent are hereby corrected as shown below:

Claim 1, line 10: cancel "out", substitute therefor

--cut--

Signed and Sealed this

Twenty-third Day of April 1985

[SEAL]

Attest:

DONALD J. QUIGG

Attesting Officer　　Acting Commissioner of Patents and Trademarks